Figure 1:
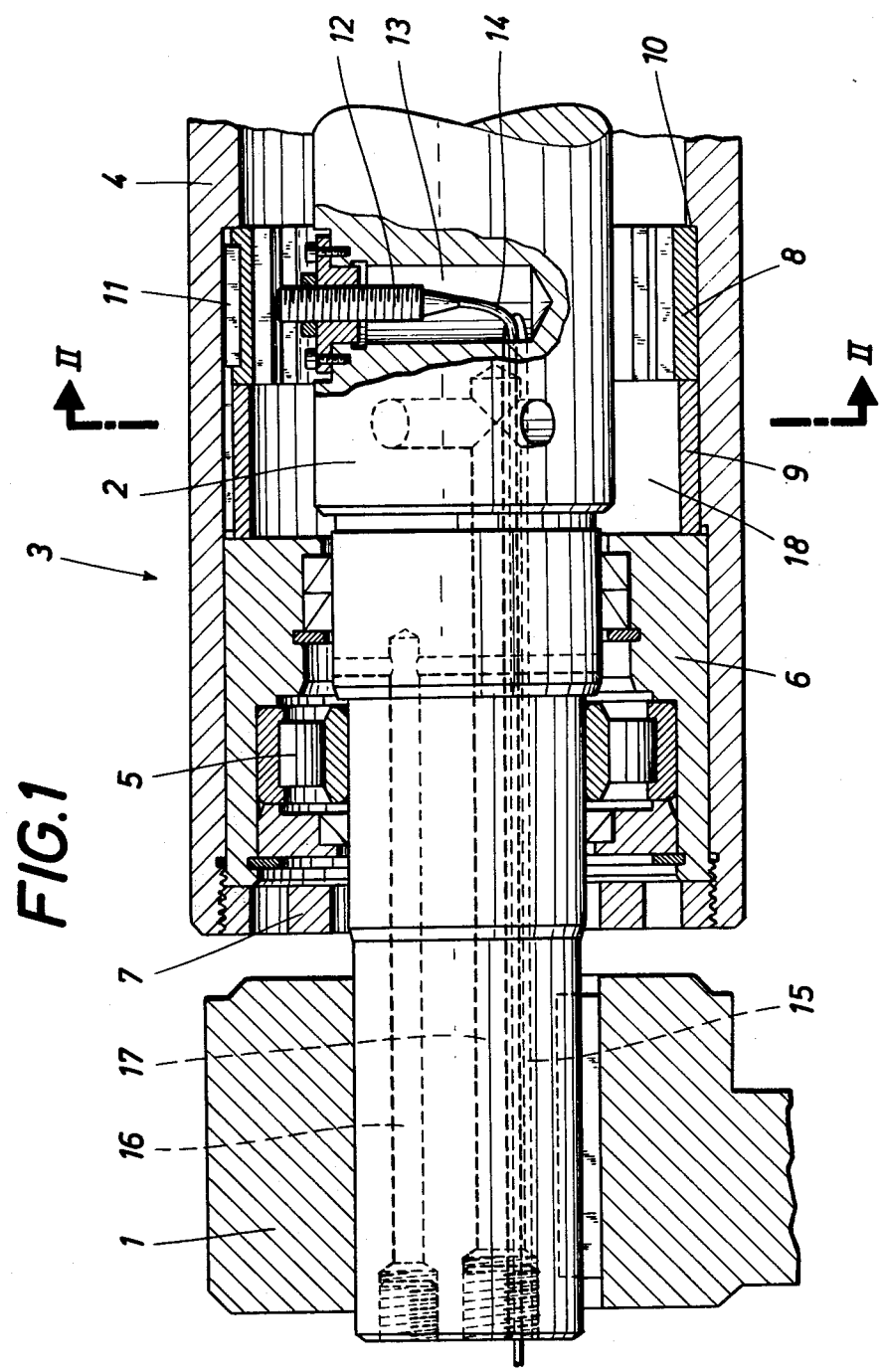

United States Patent [19]

Kunz et al.

[11] 4,070,883
[45] Jan. 31, 1978

[54] SYSTEM AND ASSEMBLY FOR MEASURING THE MOVEMENT OF STRIP AND HOT STRIP MILL

[75] Inventors: Helmut Kunz, Marchtrenk; Roland Kofler, Linz, both of Austria

[73] Assignee: Vereinigte Osterreichische Eisen- und Stahlwerke - Alpine Montan Aktiengesellschaft, Vienna, Austria

[21] Appl. No.: 781,640

[22] Filed: Mar. 28, 1977

[30] Foreign Application Priority Data

May 3, 1976  Austria ................... 3236/76

[51] Int. Cl.² ............................................. B21B 37/00
[52] U.S. Cl. ........................................ 72/14; 324/174; 72/205
[58] Field of Search ............ 324/34 PS, 34 D, 34 GT, 324/174; 72/205, 17, 10, 11, 12

[56] References Cited

U.S. PATENT DOCUMENTS

| | | | |
|---|---|---|---|
| 3,387,472 | 6/1968 | Pullen | 72/17 |
| 3,562,741 | 2/1971 | McEvoy et al. | 324/174 UX |
| 3,917,997 | 11/1975 | Sidor | 324/174 X |

*Primary Examiner*—Milton S. Mehr
*Attorney, Agent, or Firm*—Kurt Kelman

[57] ABSTRACT

A roller shell is rotatably mounted on a non-rotatable axle having an axial bore and is engageable with moving strip. A detector is non-rotatably mounted on said axle and comprises a magnet which produces a magnetic field and a sensing coil arranged to generate voltage signals in response to magnetic flux changes in said magnetic field. An annular rotor is disposed between said axle and said shell and non-rotatably connected to said shell and movable in said magnetic field to produce a predetermined magnetic flux change in said magnetic field in response to a predetermined angular movement of said shell. A lead is connected to said detector and extends in said axial bore and is arranged to transmit said voltage signals. In a hot strip mill, said axle is carried by pivoted arms tending to urge said shell against the underside of a strip contacting the top of said shell so as to support and tension said strip.

14 Claims, 2 Drawing Figures

SYSTEM AND ASSEMBLY FOR MEASURING THE MOVEMENT OF STRIP AND HOT STRIP MILL

This invention relates to apparatus for measuring the velocity of strip handled by a multiple-stand hot strip mill, comprising loop lifters each of which is arranged to apply pressure to the strip between adjacent stands and comprises a strip-supporting roller, which is rotatably mounted on an axle which is non-rotatably held by pivoted arms.

Because the increase of the velocity of a strip being rolled is related to the reduction of the strip resulting from the rolling pass, it is also possible to control the width of the nip between the rolls of a stand in dependence on the velocities of the strip measured before and behind a stand. On the other hand, it is difficult to measure the speed of a strip handled by a hot strip mill because the high temperature of the strip virtually precludes a direct contact between the strip and the sensor. Whereas non-contacting methods, employing, e.g., laser beams, have been proposed for measuring the velocity of the strip, these methods of measurement do not give results which are as accurate as is required for the control of the nip between rolls. Besides, the equipment required for this purpose is highly expensive.

For this reason it is an object of the invention to avoid these disadvantages and to provide apparatus for measuring the velocity of strip handled by a multiple-stand hot strip mill, which apparatus is of the kind described first hereinbefore and enables an accurate measurement of the velocity of strip in a simple manner.

This object is accomplished according to the invention in that an annular rotor is disposed within the shell of one roller and is coaxial with and non-rotatably connected to said shell which rotor is comprised in a known sensor, which comprises said rotor and a detector consisting of a sensing coil and a magnet, said rotor induces in the sensing coil during each revolution a predetermined number of voltage pulses, which are adapted to be fed to a counting and indicating device, the detector is carried by the axle of the roller and an axial bore of the axle accommodates a lead for connection to a counting and indicating device, which is disposed outside the loop lifter. Because the loop lifter exerts a constant force on the strip, in order to maintain a constant strip tension, the friction between the strip and the roller in contact therewith is so large that the roller is driven by the strip virtually without slip. For this reason the number of revolutions of the roller is directly proportional to the movement of the strip and can be measured to measure the velocity of the strip. For this purpose, an inductive sensor, known per se, is accommodated within the shell of the roller, and this sensor is protected against damage by the hot strip being rolled because the sensor is disposed within the shell of the roller of the loop lifter. As these loop-lifting rollers are cooled by cooling water passed between the axle and the shell of the roller, the results of measurement will not be affected by an excessively high temperature. It is apparent that the apparatus according to the invention permits of a measuring of the velocity of strip handled by multiple-stand hot strip mills without danger to the measuring means. It is surprising that this can be accomplished with inductive sensors, which are known per se. This is due to the fact that they are at least partly contacted by flowing cooling water. Whereas said cooling water as service water contains also ferromagnetic impurities, it has been found that the teeth of the annular rotor produce a high turbulance particularly adjacent to the detector disposed opposite to said teeth so that the ferrous dust which otherwise deposites on the detector is flushed off.

Whereas it is known to measure the tension of a strip by means of a roller, which deflects the strip and has a shell which is supported by rolling element bearings on a fixed axle, and by means of pressure transducers, which are disposed between the axle and the rolling element bearings and serve to measure and indicate the pressure applied by the strip to the roller, such arrangements cannot teach how the object underlying the invention can be accomplished because the pressure applied by the strip to the roller can be measured only by means of pressure transducers which are disposed between the roller shell and the fixed axle and because pressure transducers are basically different from means for measuring velocity. Besides, the operation of these pressure transducers is not based on induction. For these reasons the provision of inductive transducers within a roller shell cannot be suggested by these known rollers used to measure tension. It is also pointed out that in accordance with the invention an annular rotor is non-rotatably connected to the roller shell and the detector is carried by the fixed axle.

According to a preferred feature of the invention, a particularly simple arrangement will be provided if the detector is inserted in a radial recess of the axle. These measures greatly facilitate the adjustment and maintenance of the small air gap which is required between the detector and the rotor.

To provide for a particularly good flushing action, the rotor may have teeth which have side faces that are inclined from the axial direction and for this reason exert a certain pumping action on the stream of cooling water.

Figure 2:
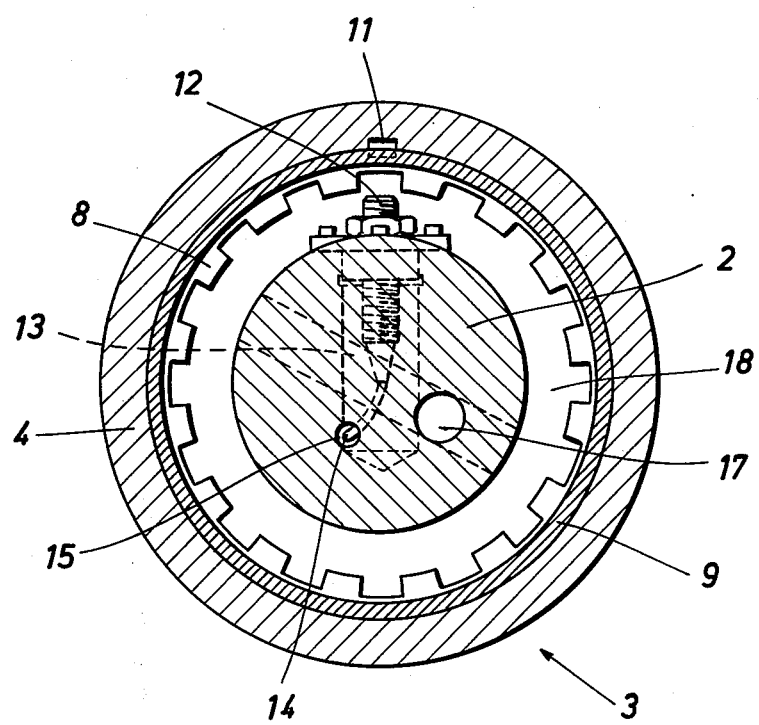

An embodiment of the invention is shown by way of example on the accompanying drawing, in which:

FIG. 1 is an axial sectional view showing part of a loop-lifting roller according to the invention and FIG. 2 is a sectional view taken on line II—II in FIG. 1.

A loop lifter is arranged between stands of a hot strip mill and essentially comprises an axle 2, which is non-rotatably held by pivoted arms 1 and on which a strip-supporting roller 3 is rotatably mounted. The pivoted arms 1 are biased by a constant torque to urge the roller 3 against the strip so that a constant tension can be maintained in the strip.

The roller 3 comprises a shell 4 and end walls 6, which carry the shell 4 and are mounted on the axle 2 by rolling element bearings 5 and are fixed to the shell 4 by threaded covers 7.

An annular rotor 8 is coaxially disposed in the roller shell 4 and provided with radially inwardly directed teeth. The rotor 8 is forced by the threaded cover 7 through the intermediary of the end wall 6 and a spacing sleeve 9 against an internal shoulder 10 of the roller shell 4 and is rotatably connected to the latter by a feather key 11.

This annular rotor 8 cooperates with a detector 12, which is watertightly inserted in a radial recess 13 of the axle. The detector 12 comprises a magnet and a sensing coil, in which a voltage is induced by the magnetic flux changes which are due to the movement of successive rotor teeth past the detector. The voltage pulses which are thus induced are fed by a lead 14 in an axial bore 15 of the axle 2 to a counting and indicating device, which is disposed outside the loop lifter. An amplifier may be connected between the coil and the counting and indicating device. For this reason the number of voltage pulses induced in a predetermined measuring time is directly proportional to the number of revolutions of the roller 3 during that time and consequently to the velocity of the strip so that the counting and indicating device can be used to indicate also the velocity of the strip.

In addition to the axial bore 15, the axle 2 comprises further bores 16 and 17. The bores 16 serves to supply lubricant to the rolling element bearing 5, and the bore 17 serves for the supply of cooling water. Through the bore 17, the cooling water is pumped into a space 18 between the axle 2 and the roller shell 4 so that the sensor comprising the rotor 8 and detector 12 is cooled too. In spite of the ferromagnetic impurities which must be expected in the cooling water, this cooling does not adversely affect the function of the sensor.

What is claimed is:

1. An assembly for measuring the movement of strip, comprising
    a non-rotatable axle having an axial bore,
    a roller shell rotatably mounted on said axle and engageable with said strip,
    a detector non-rotatably mounted on said axle and comprising a magnet which produces a magnetic field and a sensing coil arranged to generate voltage signals in response to magnetic flux changes in said magnetic field,
    an annular rotor disposed between said axle and said shell and non-rotatably connected to said shell and movable in said magnetic field and adapted to produce a predetermined magnetic flux change in said magnetic field in response to a predetermined angular movement of said shell, and
    a lead connected to said detector and extending in said axial bore and arranged to transmit said voltage signals.

2. An assembly as set forth in claim 1, in which
    said axle has a radial recess and
    said detector is mounted in said recess.

3. An assembly as set forth in claim 1, in which
    said rotor is formed with peripherally equally spaced teeth and
    said sensing coil is adapted to generate a voltage pulse in response to the movement of each of said teeth past said magnet.

4. An assembly as set forth in claim 1, in which said teeth have side faces which are inclined from the axis of said axle.

5. An assembly as set forth in claim 1, for measuring the movement of hot strip, in which
    said shell and axle define a space between them,
    means are provided to pass a cooling fluid through said space and
    said rotor and detector adjoin said space to be contacted by said cooling fluid.

6. An assembly as set forth in claim 5, in which
    said rotor is formed with peripherally equally spaced teeth which adjoin said space,
    said sensing coil is adapted to generate a voltage pulse in response to the movement of each of said teeth past said magnet.

7. An assembly as set forth in claim 6, in which said teeth have side faces which are inclined from the axis of said axle.

8. An assembly as set forth in claim 1, in which said axle is carried by pivoted arms tending to urge said roller shell against the underside of a strip contacting the top of said roller shell so as to support and tension said strip.

9. A hot strip mill comprising a rolling mill stand and at least one assembly for measuring the movement of strip as it is rolled in said mill, said assembly comprising
    an axle having an axial bore,
    a roller shell rotatably mounted on said axle,
    pivoted arms carrying said axle and tending to urge said roller shell against the underside of a strip contacting the top of said roller shell to support and tension said strip,
    a detector non-rotatably mounted on said axle and comprising a magnet which produces a magnetic field and a sensing coil arranged to generate voltage signals in response to magnetic flux changes in said magnetic field,
    an annular rotor disposed between said axle and said shell and non-rotatably connected to said shell and movable in said magnetic field to produce a predetermined magnetic flux change in said magnetic field in response to a predetermined angular movement of said shell, and
    a lead connected to said detector and extending in said axial bore and arranged to transmit said voltage signals.

10. A hot strip mill as set forth in claim 8, which comprises two of said assemblies, which respectively precede and succeed said rolling mill stand in the path of said strip.

11. A hot strip mill as set forth in claim 1, in which
    at least two rolling mill stands are provided and
    said shell contacts said strip between said two rolling mill stands.

12. A system for measuring the movement of strip, comprising
    an axle having an axial bore,
    a roller shell rotatably mounted on said axle and engageable with said strip,
    a detector non-rotatably mounted on said axle and comprising a magnet which produces a magnetic field and a sensing coil arranged to generate voltage signals in response to magnetic flux changes in said magnetic field,
    an annular rotor disposed between said axle and said shell and non-rotatably connected to said shell and movable in said magnetic field and adapted to produce a predetermined magnetic flux change in said magnetic field in response to a predetermined angular movement of said shell,
    a lead connected to said detector and extending in said axial bore and arranged to transmit said voltage signals,
    an integrator disposed outside said axle and shell and connected to said lead and adapted to integrate said voltage signals.

13. A system as set forth in claim 11, in which said integrator is adapted to indicate the surface velocity of said roller shell.

14. A system as set forth in claim 11, in which
    said rotor is formed with peripherally equally spaced teeth,
    said sensing coil is adapted to generate a voltage pulse in response to the movement of each of said teeth past said magnet, and
    said integrator comprises a counter adapted to count said pulses.

* * * * *